United States Patent
Faust

[11] 3,906,745
[45] Sept. 23, 1975

[54] ELASTIC COUPLING

[75] Inventor: Werner Faust, Unna, Germany

[73] Assignees: Vulkan Kupplungs-und Getriebebau; Bernhard Hackforth, both of Germany

[22] Filed: Mar. 14, 1974

[21] Appl. No.: 451,238

[52] U.S. Cl. .............. 64/11 R; 64/27 NM; 64/13; 64/15 C
[51] Int. Cl. ............................................. F16d 3/17
[58] Field of Search ........... 64/27 NM, 11 R, 13, 6, 64/15 C

[56] References Cited
UNITED STATES PATENTS

| | | | |
|---|---|---|---|
| 1,242,049 | 9/1927 | Waltz | 64/11 R |
| 2,816,424 | 12/1957 | Vorthmann | 64/11 R |
| 3,283,534 | 11/1966 | Reich | 64/11 R |
| 3,298,487 | 1/1967 | Tolksdorf et al. | 64/11 R |
| 3,354,670 | 11/1967 | Fawick | 64/11 R |

FOREIGN PATENTS OR APPLICATIONS

| 1,066,061 | 9/1959 | Germany | 64/13 |
|---|---|---|---|

Primary Examiner—Samuel Scott
Assistant Examiner—Randall Heald
Attorney, Agent, or Firm—Toren, McGeady and Stanger

[57] ABSTRACT

An elastic shaft coupling with an annular disk-shaped coupling element is made in part of elastic rubber material. The coupling element transmits the torque between rigid coupling components which are situated concentrically one inside the other. The coupling element includes reinforcement rings embedded in the elastic rubber material in the area of the marginal zones of the coupling element. Further, sector-shaped reinforcement inserts are also embedded in the elastic rubber material at equal distances from each other. The reinforcement inserts comprise a plurality of threads which embrace the reinforcement rings and form radial loops. In accordance with the invention, the reinforcement rings are made of bending-resistant flat rings an which the reinforcement inserts are secured in their position between the radial marginal edges of sector-shaped projections which are outwardly oriented on the outer reinforcement ring and inwardly oriented on the internal reinforcement ring.

9 Claims, 4 Drawing Figures

ELASTIC COUPLING

SUMMARY OF THE INVENTION

The invention relates to shaft couplings with an annular disk-shaped coupling element made of elastic rubber or rubber-like material which transmits the torque between rigid coupling parts or components which are situated concentrically inside one another, in which material of the coupling element reinforcement rings are embedded in the area of the marginal zones of the coupling element and in which sector-shaped reinforcement inserts at equal distances from each other are embedded, said reinforcement inserts consisting of filaments or threads which embrace the reinforcement rings repeatedly in radial direction to form radial loops.

In a coupling of this type known from U.S. Pat. No. 1,604,925, the reinforcement rings consist of circular or multi-sided wire and, on account of the low bending strength of this wire, are unable to absorb or to transmit between the rigid coupling components and the elastic coupling element without any risk of deformation the torsional and tensile forces arising in the operation of the coupling. In order nevertheless to achieve this objective, the marginal zones of the coupling element which surround the reinforcement rings are affixed to the rigid coupling components in that they are clamped by means of circumferentially distributed paraxial clamping bolts between the mutually facing annular bending-resistant components which are bolted to the rigid coupling components or else constitute parts of these rigid coupling components.

Experience has shown that elastic rubber masses rigidly clamped only at certain sites between rigid components are, as a result of the tensile and bending forces arising at the clamping sites and which, in the case of elastic couplings, act in continuous change in the two circumferential as well as in axial and even radial directions, become increasingly damaged in the border areas of the clamping sites after a relatively short period of operation.

Such damage, in the case of the couplings in question in particular at the sites taking part in the transfer of forces, i.e., preferably arising in the area of the reinforcement inserts consequently results at certain sites in loosening the clamping connections, resulting in turn in a differential participation of the sector-shaped reinforcement inserts or insert components at the transfer of force and, therefore, in the overloading of individual inserts or insert components.

It is the object of the invention to obviate the described drawbacks with couplings of the aforementioned type in that clamping sites and their disadvantageous effects are obviated and, as a result, one extends considerably not only the life of the elastic coupling element but assures also at any time the uniform participation of all reinforcement inserts as well as their components in the transfer of forces between the rigid coupling components.

In the case of the couplings described above, the invention achieves this object in that the reinforcement rings consist of bending-resistant flat rings at which the reinforcement inserts are secured in their position through the radial marginal edges of sector-shaped projections outwardly oriented at the outer reinforcement ring and inwardly oriented at the internal reinforcement ring.

The bending-resistant flat rings uniformly absorb without yielding the tensile forces exerted upon them by the reinforcement inserts and make it possible to transmit forces, oriented in any direction, between them and the rigid coupling components over a relatively low number of locally limited attachment sites. For the arrangement of these attachment sites there are available the reinforcement-free sites of the reinforcement rings situated in the area of the sector-shaped projections. As a result, one avoids not only the passage of attachment means through the reinforcement inserts, which can readily result in damage, and makes possible the use of bolts even of a large diameter, but one achieves also, in spite of a reduced number of attachment sites, a considerably improved friction contact between coupling element and rigid coupling components.

The limitation of the reinforcement inserts to sectors separated by interim spaces makes it even possible to dispense in the area of the attachment sites with a coating of the reinforcement rings by the elastic-rubber mass and to create thereby a totally unyielding connection via direct metallic contact areas between rigid coupling elements, reinforcement rings, and attachment means.

Besides, the bending-resistant reinforcement rings in connection with the sector-shaped reinforcement inserts permit the subdividing of the coupling element into sectors constituting inherently stable components which without a detaching of the rigid coupling elements from their shafts can be installed and dismantled and, if necessary, also be individually replaced. Such a subdividing of the coupling element facilitates also the mounting of the filament windings constituting the reinforcement inserts.

Finally, the structure of the reinforcement inserts of the filament loops surrounding the two reinforcement rings makes it possible to design the coupling element to have a hose shape in that the parts of the elastic rubber material extending on either side between the circumferential areas, averted from one another, of the reinforcement rings are outwardly curved in opposite directions with the parts of the filament windings embedded therein and enclose an annular cavity jointly with the mutually facing edges of the reinforcement rings.

Such a design of the coupling element increases the yieldability of the coupling and facilitates the dissipation of heat generated inside the elastic rubber mass. The result is a particularly effective cooling of the coupling element in operation the moment the cavity is in connection with the ambient air through the gap between the sectors of the coupling element.

The drawing schematically illustrates exemplified embodiments of the coupling constituting the object of the invention. In the drawings.

Figure 1:
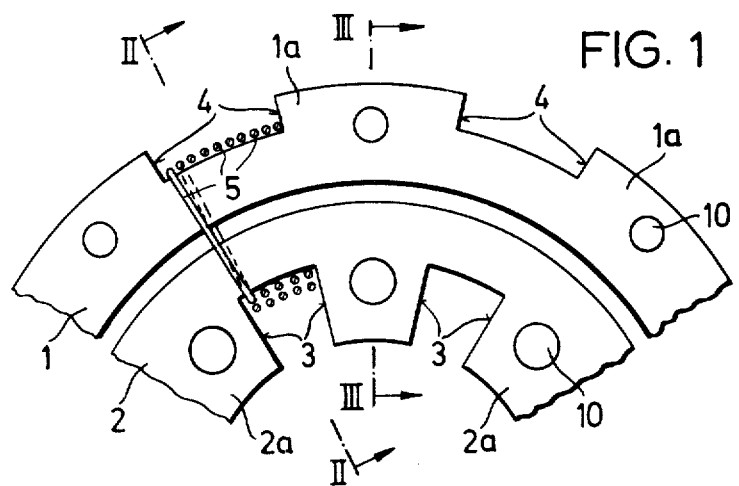
FIG. 1 represents a section as an elevation of two reinforcement rings belonging to a coupling element with a cross-section of a reinforcement insert about to be produced.
Figure 2:
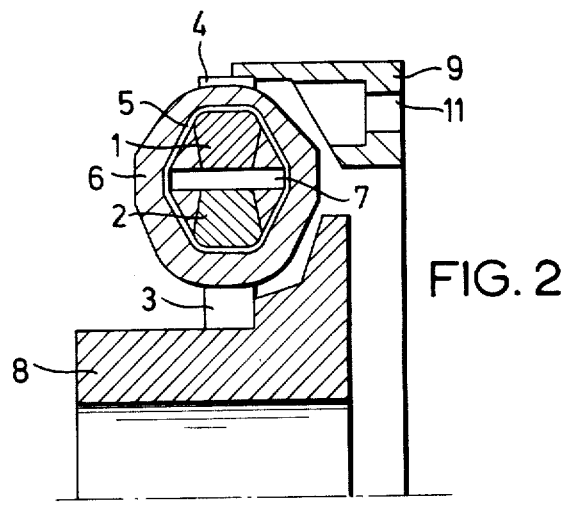
FIG. 2 represents an axial partial section through one half of the coupling along line II—II of FIG. 1.
Figure 3:
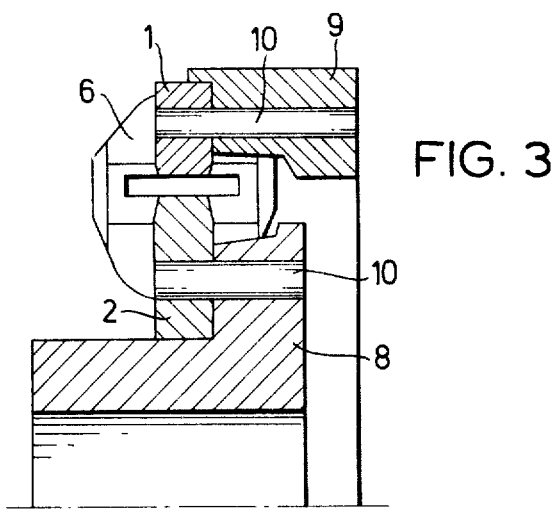
FIG. 3 represents a section corresponding to FIG. 2 along line III—III of FIG. 1.
Figure 4:
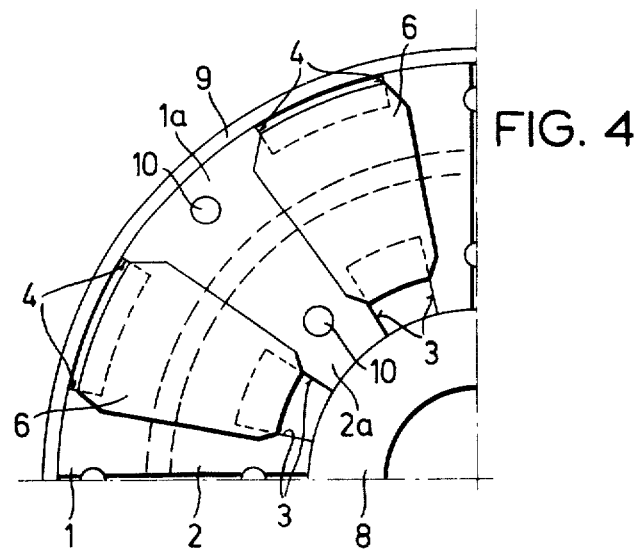
FIG. 4 represents in elevation a 90° sector of the complete coupling.

As can be seen from FIGS. 2, 3, and 4, the rigid parts of the coupling to be twist-resistantly connected with the shafts to be coupled consist in per se known manner of the hub section 8 and the outer ring 9 coaxially surrounding it at a distance.

The annular disk-shaped coupling element made of elastic-rubber material, for instance vulcanized natural rubber, yieldingly connecting said two coupling elements 8 and 9 in all directions, covers in the embodiment in accordance with FIG. 4 the flat lateral surfaces of the marginal reinforcement rings 1 and 2 designed as flat rings bending-resistant particularly in radial directions and encloses with its correspondingly thickened parts 6 sector-shaped reinforcement inserts 5 uniformly distributed over its circumference, which reinforcement inserts enclose with their marginal areas respectively one reinforcement ring 1 and 2. As reinforcement insert one preferably uses a filament 5 multiply wound around the two reinforcement rings 1 and 2 in radial directions in the area of each sector 6 in each case prior to the application of the still viscous elastic rubber material. Radially opposite positioned projections 1a and 2a provided at the edges of the reinforcement rings 1 and 2 averted from one another secure with their radial edge surfaces 3 and 4 the filaments loops of the adjoining reinforcement inserts 5 in their position in which they are subsequently fixed additionally to the reinforcement rings and with respect to one another throught the solidified elastic rubber mass.

As can be gathered from FIG. 2, the reinforcement insert 5 consisting of filament loops makes it possible to design the coupling element in a simple manner in such a way that the parts of the reinforcement insert 5 situated on either side of the reinforcement rings 1 and 2 between their edges averted from one another are outwardly curved in opposite direction with the elastic rubber mass surrounding them and enclose an annular-shaped cavity 7.

Boreholes 11 provided in the rigid outer ring 9 of the coupling serve for the attaching of the outer ring 9 to the flange of a hub section connected with the other shaft.

FIG. 3 shows an embodiment in which the reinforcement rings 1 and 2 in the area of the sites provided with passage bore holes 10 to which there is bolted the coupling element with its rigid coupling components 8 and 9, is not coated by the elastic rubber material and, as a result, the coupling components bolted to one another and the attachment bolts (not shown) apply directly with their metallic surfaces against the contact sites.

The FIGS. 2 and 3 furthermore show that the parts 6 of the coupling element provided with sector-shaped reinforcement inserts do not contact the rigid coupling components 8 and 9 and are therefore not exposed to the hazard of external damage.

What is claimed is:

1. An elastic shaft coupling comprising a pair of rigid coupling elements disposed in spaced relation and an annular disk-shaped coupling element positioned between and connected to said coupling components, said coupling element arranged to transmit torque between said coupling components, wherein the improvement comprises that said coupling element comprises a first bending-resistant reinforcement ring, a second bending-resistant reinforcement ring laterally enclosing and spaced radially outwardly from said first reinforcement ring, a plurality of reinforcement inserts securing said first and second reinforcement rings together, each of said reinforcement inserts extending radially around said first and second reinforcement rings, each reinforcement insert comprising a plurality of radially extending loops of a member wrapped around said first and second reinforcement rings and an elastic material embedding said members and enclosing at least a portion of said first and second reinforcement rings.

2. An elastic shaft coupling, as set forth in claim 1, wherein the radially inner edge of said first reinforcement ring and the radially outer edge of said second reinforcement ring each have angularly spaced sector-shaped projections with each of the projections on said first reinforcement ring being in radial alignment with a corresponding projection on said second reinforcement ring, and each of said reinforcement inserts being located between a pair of adjacent sector-shaped projections on said first and second reinforcement rings.

3. An elastic shaft coupling, as set forth in claim 2, wherein said member wrapped around said first and second reinforcement rings comprises a filament-like member.

4. An elastic shaft coupling, as set forth in claim 1, wherein said elastic material is a rubber-like material.

5. An elastic shaft coupling, a set forth in claim 1, wherein said elastic material is a rubber-like material.

6. An elastic shaft coupling, as set forth in claim 2, wherein apertures are formed in said first and second reinforcement rings in the radially extending portions thereof including said sector-shaped projections and located between adjacent said reinforcement inserts, and a bolt extending through each said aperture for securing one of said reinforcement rings to one of said coupling components.

7. An elastic shaft coupling, as set forth in claim 3, wherein said filament-like members and the outer surface of said elastic material on two opposite sides of said first and second reinforcement rings have a convex shape, and an annular cavity formed between the radially outer surface of said first reinforcement ring and the radially inner surface of said second reinforcement ring and each said reinforcement insert surrounding the annular cavity.

8. An elastic shaft coupling, as set forth in claim 7, wherein said annular cavity in the radially extending portions of said coupling element containing said sector-shaped projections is in communication with the ambient air.

9. An elastic shaft coupling, as set forth in claim 3, wherein the filament-like members are located radially outwardly from the radially inner edge of the sector-shaped projections on said first reinforcement ring and radially inwardly from the radially outer edge of the sector-shaped projections on said second reinforcement ring.

* * * * *